E. H. LONG.
TELEPHONE MOUTHPIECE.
APPLICATION FILED DEC. 10, 1908.

943,946.

Patented Dec. 21, 1909.

Witnesses,

Inventor,
Edward H. Long,
by Hazard & Thacher
Attorneys.

UNITED STATES PATENT OFFICE.

EDWARD H. LONG, OF LOS ANGELES, CALIFORNIA.

TELEPHONE-MOUTHPIECE.

943,946.

Specification of Letters Patent. Patented Dec. 21, 1909.

Application filed December 10, 1908. Serial No. 466,863.

*To all whom it may concern:*

Be it known that I, EDWARD H. LONG, a citizen of the United States, residing at Los Angeles, in the county of Los Angeles and State of California, have invented new and useful Improvements in Telephone-Mouthpieces, of which the following is a specification.

Figure 1:
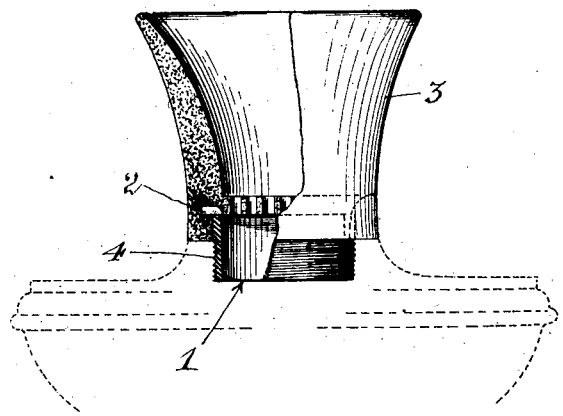
Figure 2:
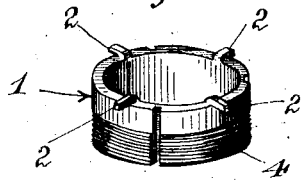

The object of my invention is to provide a removable mouth-piece, the projecting screw threaded shank of which is not easily broken, doing away with the inconvenience and loss caused thereby. I accomplish these objects by means of the device described herein and shown in the accompanying drawings, in which:

Figure 1—is a side elevation partly broken away and partly in section of my improved mouth-piece. Fig. 2—is a perspective view of my improved metallic attachment therefor.

These mouth-pieces are usually made of insulating material and are preferably cast into the shape in which they are used and are provided with a screw threaded extension or shank for screw threaded engagement with the transmitter shown in dotted lines in Fig. 1. This material is more or less brittle and as a result the screw threaded shank is often broken off when any unusual strain is placed thereon. To obviate this objection I provide a metallic screw threaded attachment 1 as shown in Fig. 2. This is preferably stamped out of sheet brass or other suitable metal and is provided with projecting lugs 2 adapted to be embedded in the material out of which the mouth-piece 3 is molded and to hold the same firmly in place as shown in Fig. 1.

It will be apparent from the above described construction that by forming the threaded shank 4 of the mouth-piece of metal, that all danger of breakage or other injury thereto when attaching it to the telephone transmitter is obviated.

Having described my invention what I claim as new and desire to secure by Letters Patent is:—

1. A mouth-piece for a telephone transmitter, comprising a cylindrical member formed of an electrical insulating material and having one of its ends flared outwardly, and a metallic cylindrical screw-threaded transmitter attachment means secured to the end opposite the flared end of the cylindrical member, said means having attaching prongs formed on the end that engages the cylindrical member, whereby to maintain the two members in rigid engagement with each other.

2. A mouth-piece for telephone transmitters, comprising an exteriorly screw-threaded tubular base member formed of metal and provided on the upper end thereof with a plurality of attaching prongs formed integrally therewith and extending at right angles thereto, and a body member formed of an insulating material rigidly secured to said base member, the attaching prongs rigidly securing the two members together.

In witness that I claim the foregoing I have hereunto subscribed my name this 4th day of December, 1908.

EDWARD H. LONG.

Witnesses:
HENRY T. HAZARD,
EDMUND A. STRAUSE.